US007850511B2

(12) United States Patent
Voll et al.

(10) Patent No.: US 7,850,511 B2
(45) Date of Patent: Dec. 14, 2010

(54) METHOD AND A DEVICE FOR FACILITATING THE REMOVAL OF PIN BONES IN FISH

(75) Inventors: Tor Voll, Raege (NO); Oddmund Haugland, Stavanger (NO)

(73) Assignee: Eiganes Invest AS (NO)

( * ) Notice: Subject to any disclaimer, the term of this patent is extended or adjusted under 35 U.S.C. 154(b) by 0 days.

(21) Appl. No.: 11/631,492

(22) PCT Filed: Jun. 29, 2005

(86) PCT No.: PCT/NO2005/000237
§ 371 (c)(1),
(2), (4) Date: Nov. 29, 2007

(87) PCT Pub. No.: WO2006/004420
PCT Pub. Date: Jan. 12, 2006

(65) Prior Publication Data
US 2008/0261502 A1 Oct. 23, 2008

(30) Foreign Application Priority Data
Jul. 7, 2004 (NO) .................. 20042875

(51) Int. Cl.
A22C 25/16 (2006.01)
(52) U.S. Cl. ..................... 452/137; 452/135
(58) Field of Classification Search ............. 452/135, 452/137, 161
See application file for complete search history.

(56) References Cited

U.S. PATENT DOCUMENTS

| 3,902,222 | A | * | 9/1975 | Hartmann | 452/135 |
| 3,955,242 | A | * | 5/1976 | Hartmann | 452/135 |
| 4,037,294 | A |   | 7/1977 | Cowie et al. | |
| 4,056,866 | A | * | 11/1977 | Wenzel | 452/135 |
| 4,151,629 | A | * | 5/1979 | Braeger | 452/121 |
| 4,771,511 | A |   | 9/1988 | Weyand | |
| 4,920,612 | A | * | 5/1990 | Moore | 452/161 |
| 4,945,607 | A | * | 8/1990 | Akesson et al. | 452/135 |
| 5,830,052 | A |   | 11/1998 | Wadsworth | |
| 5,911,621 | A | * | 6/1999 | Durst et al. | 452/135 |
| 5,947,808 | A | * | 9/1999 | Adams | 452/6 |
| 6,123,614 | A | * | 9/2000 | Kozycki | 452/135 |
| 6,406,366 | B1 | * | 6/2002 | Kozycki | 452/135 |
| 6,935,941 | B1 | * | 8/2005 | Muehlenbeck | 452/103 |
| 2003/0109210 | A1 | * | 6/2003 | Jacobsen et al. | 452/138 |

FOREIGN PATENT DOCUMENTS

GB 1461296 1/1977
WO WO 01/84941 11/2001

OTHER PUBLICATIONS

International Search Report dated Oct. 25, 2005.
Written Opinion dated Oct. 25, 2005.

* cited by examiner

Primary Examiner—David J Parsley
(74) Attorney, Agent, or Firm—Andrus, Sceales, Starke & Sawall, LLP

(57) ABSTRACT

A method and a device for facilitating the removal of a pin bone (2) from fish flesh, wherein the pin bone (2) is cut within a filet part of the fish flesh.

6 Claims, 2 Drawing Sheets

METHOD AND A DEVICE FOR FACILITATING THE REMOVAL OF PIN BONES IN FISH

CROSS REFERENCE TO RELATED APPLICATION

The present application is the U.S. national stage application of International Application PCT/NO2005/000237, filed Jun. 29, 2005, which international application was published on Jan. 12, 2006 as International Publication WO 2006/004420. The International Application claims priority of Norwegian Patent Application 20042875, filed Jul. 7, 2004.

BACKGROUND OF THE INVENTION

This invention concerns a method for facilitating the removal of pin bones in fish. More particularly, it relates to a method in which the pin bone is cut closest to its outwardly projecting portion, and in which the relatively hard bone portion of the pin bone then may be removed from the fish flesh, whereas the softer cartilage portion of the pin bone may remain in the fish. The invention also comprises a device for carrying out the method.

As known, a vertically and upwardly-directed bone projects out from the dorsal vertebra of a fish, and with respect to the foremost dorsal vertebras, also at least two rib bones encircle the abdominal cavity. In several species of fish, including species of salmon, the foremost dorsal vertebras are also provided with two so-called dorsal ribs projecting substantially horizontally outward in either direction from the dorsal vertebra. Oftentimes the dorsal ribs are described as pin bones.

The pin bone comprises a relatively hard bone portion closest to the dorsal vertebra and a softer cartilaginous portion comprising collagenic fibres closest to its outer end portion. The outer end portion is provided with a relatively large number of threadlike, soft tendons extending from the cartilage portion and out into the fish flesh. These tendons connect the pin bone with the fish flesh in an efficient manner.

When the pin bone is to be removed from the fish flesh during cleaning of fresh fish, said relatively strong connection between the pin bone and the fish flesh causes the pin bone to be torn off in a position along the length thereof, or that some fish flesh is entrained with the pin bone out of the fish. If fish flesh is entrained with the pin bone, this results in lost profits from the fish flesh, opening in the filet and damage within the fish flesh.

To remedy this problem, it is common in the art to cut the fish flesh in a V-shape along the pin bones in order to remove them, or to wait until rigor mortis has abandoned the flesh and then remove them.

To achieve efficient cleaning and fish production, it is desirable to be able to remove the pin bones during the same cleaning process that comprises removal of the other bones of the fish. As such, it is both cumbersome and cost driving to have to store the fish intermediately and then remove the pin bones. It is also undesirable to have to cut the fish flesh along the pin bones in order to remove them, insofar as this causes the fish flesh to be damaged.

Locating the pin bones and the very removal operation may be carried out by means of methods and devices familiar to person skilled in the art and is therefore not described in further detail.

The object of the invention is to remedy or reduce at least one of the disadvantages of prior art.

SUMMARY OF THE INVENTION

The object is achieved in accordance with the invention and by means of the features disclosed in the following description and in the subsequent claims.

In order to enable the removal of the relatively hard bone portion of the pin bone from fresh fish flesh, the pin bone is cut inside the filet part of the fish flesh, typically in a position closer to the end portion of the pin bone projecting outwardly into the fish flesh than that of the opposite end portion of the pin bone, prior to removing the pin bone.

At least a part of the relatively soft end portion, which comprises tendons, thus remains in the fish flesh after otherwise having removed the pin bone. These remaining portions, however, are sufficiently soft to normally not be perceived as bones when eaten.

The pin bones may be cut while present in the fish flesh, for example by means of displacing a knife within the fish flesh. Advantageously, the knife is displaced from the head end of a fish filet and in the direction along the row of pin bones, thereby rendering possible to cut all pin bones on one side in the same cutting operation.

Such a cutting operation may be carried out manually by means of a handheld knife, in which the knife comprises a relatively lengthy knife blade having a sharp edge in the end portion facing the fish. When this sharp end portion is displaced substantially perpendicularly against and past the pin bones, the pin bones are cut in predetermined position along their length.

Obviously, this operation may be automated, for example by providing a prior art head cutting machine, cleaning machine or filleting machine with the necessary equipment.

BRIEF DESCRIPTION OF THE DRAWINGS

Hereinafter, a non-limiting example of a preferred method and embodiment is described, which is illustrated on the accompanying drawings, in which.

DETAILED DESCRIPTION OF THE INVENTION

Figure 1:
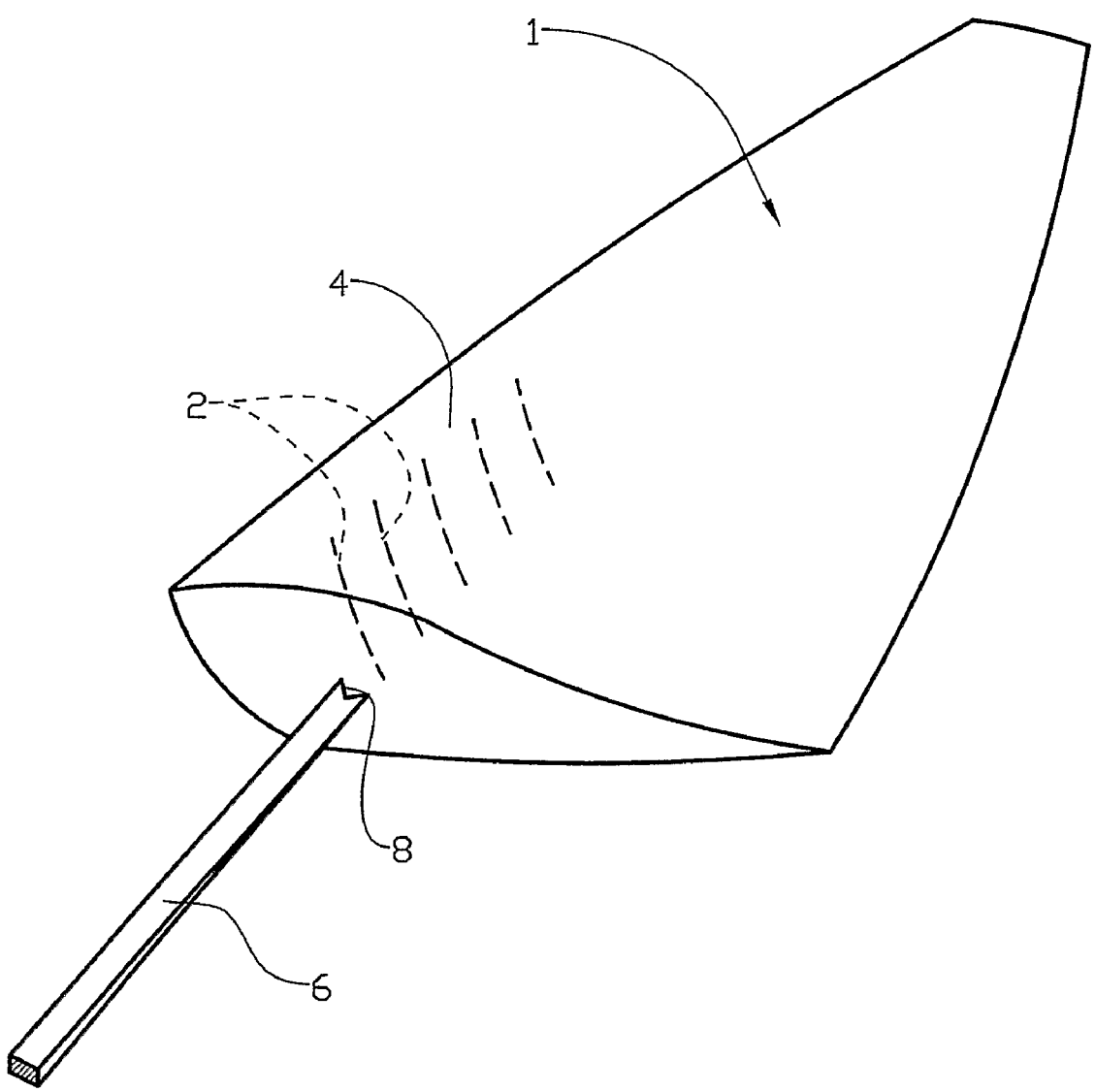
FIG. 1 shows a fish filet in perspective and schematically, in which the pin bones are indicated in dash lines, and in which a knife is located in a position being prepared for insertion into the fish flesh.

On the drawings the reference numeral 1 denotes a fish filet comprising a number of pin bones 2. The pin bones 2 have been cut from their respective dorsal vertebras (not shown) and project from an upward-facing surface 4 of the fish filet 1 and into the fish filet 1.

When the fish filet 1 is in this position, the pin bones 2 may be gripped and pulled out by means of equipment known per se (not shown).

Figure 2:
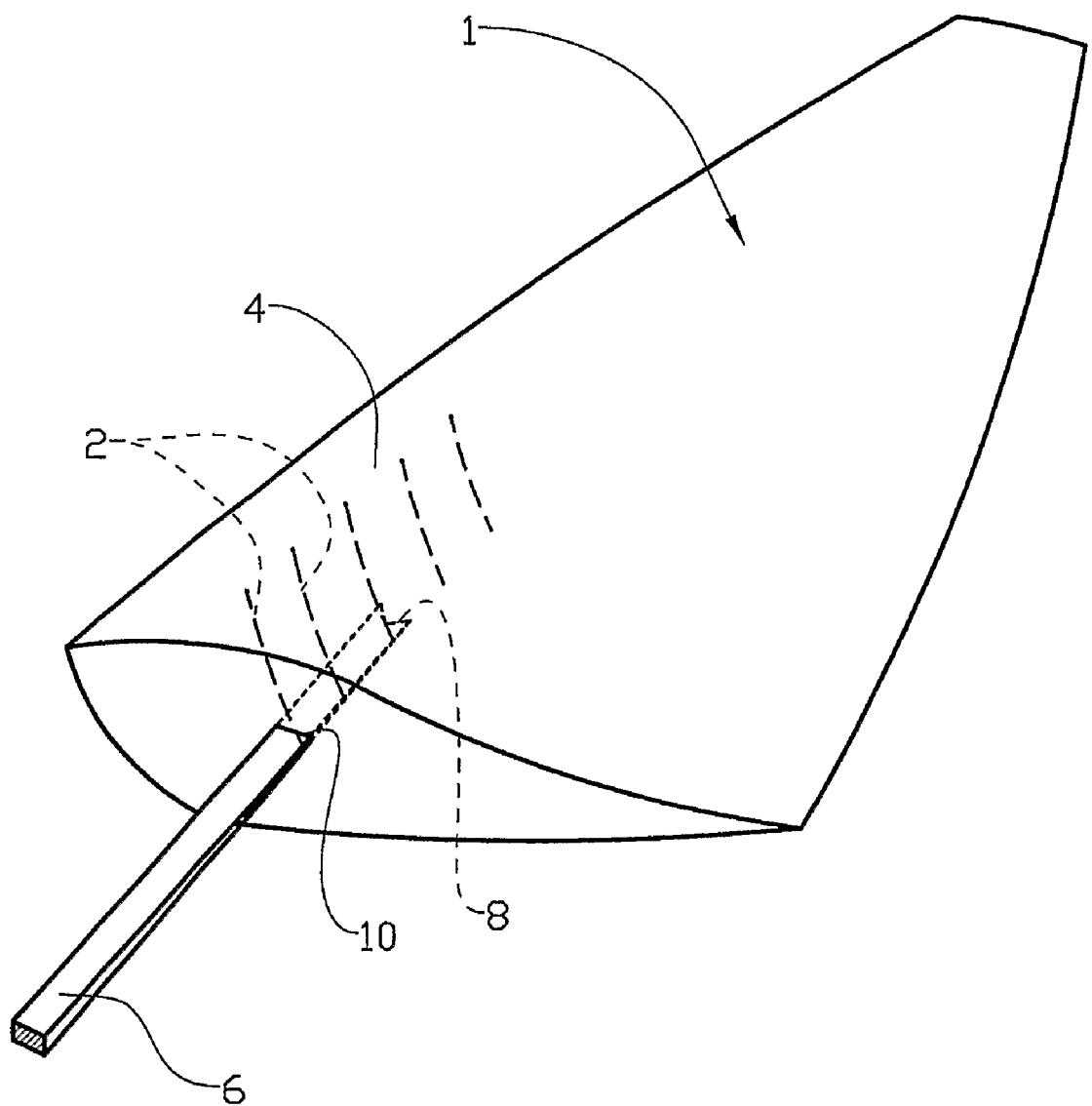
FIG. 2 shows the same as in FIG. 1, but here the knife is displaced some distance into the fish flesh.

Prior to carrying out the removal, a knife 6, which is provided with an edge 8 at an end portion thereof facing the fish filet 1, is displaced into the fish filet 1 and along the row of pin bones 2, cf. FIG. 2, thereby cutting the pin bones 2.

Upon being removed, the knife 6 leaves behind a cut 10 in the fish filet 1. The knife 6, however, is formed with a relatively narrow cross section, and the cut 10 thus does not significantly diminish the quality of the fish filet 1.

In the example of an embodiment shown, the edge 8 is V-shaped to better seek out the pin bones 2 during the displacement of the knife 6 in the fish filet 1.

The invention claimed is:

1. A method of facilitating removal of a plurality of pin bones extending in a row and transversely outwardly from an elongated dorsal vertebra in a filet portion of fish flesh, each pin bone having a hard bone portion and a softer cartilaginous portion that are disposed inside the filet portion, the method comprising the steps of:

inserting a knife into the filet portion in a direction transverse to the plurality of pin bones extending in a row and against the pin bones to cut all of the hard bone portions from the softer cartilaginous portions at a location inside of the filet portion in a single motion;

pulling the hard bone portions out of the inside of the filet portion, away from the softer cartilaginous portions.

2. The method according to claim 1, wherein the softer cartilaginous portions are attached to tendons that remain inside the fish flesh after removal of the hard bone portions.

3. The method according to claim 1, wherein the hard bone portions have a first end portion projecting into the fish flesh and a second end portion extending out of the fish flesh, wherein each pin bone is cut at a location closer to the first end portion than the second end portion.

4. The method according to claim 1, wherein the knife is configured to be hand-held.

5. The method according to claim 1, further comprising the step of removing the knife from the filet portion in a direction opposite of the direction of insertion.

6. The method according to claim 1, wherein said knife has a cutting end that is V-shaped.

* * * * *